United States Patent [19]
Sargent et al.

[11] Patent Number: 5,522,919
[45] Date of Patent: Jun. 4, 1996

[54] METHOD FOR TRANSPORTING HAZARDOUS MATERIALS

[75] Inventors: James W. Sargent, Jim Thorpe; Scott R. Dismukes, Pittsburgh, both of Pa.

[73] Assignee: Sargent Contracting, Inc., Jim Thorpe, Pa.

[21] Appl. No.: 335,082

[22] Filed: Nov. 7, 1994

[51] Int. Cl.$^6$ ................................................ B01D 46/00
[52] U.S. Cl. ................... 95/273; 55/356; 55/369
[58] Field of Search .................... 55/341.7, 356, 55/367, 369, 383; 95/273, 277, 284, 287

[56] References Cited

U.S. PATENT DOCUMENTS

| | | | |
|---|---|---|---|
| 4,323,377 | 4/1982 | Jolin | 55/341 HM |
| 4,604,111 | 8/1986 | Natale | 55/97 |
| 4,786,295 | 11/1988 | Newman et al. | 55/213 |
| 4,979,967 | 12/1990 | Walter et al. | 55/84 |
| 5,067,856 | 11/1991 | Sisk | 406/41 |
| 5,090,972 | 2/1992 | Eller et al. | 55/20 |
| 5,096,474 | 3/1992 | Miller, Jr. et al. | 55/213 |
| 5,127,927 | 7/1992 | Holmes et al. | 55/313 |
| 5,129,922 | 7/1992 | Kaiser | 55/96 |
| 5,147,427 | 9/1992 | Abbot et al. | 55/302 |
| 5,173,094 | 12/1992 | Brady | 55/233 |
| 5,192,343 | 3/1993 | Henry | 55/213 |
| 5,277,654 | 1/1994 | Fenn et al. | 454/141 |
| 5,284,517 | 2/1994 | Ratzesberger | 118/315 |

OTHER PUBLICATIONS

Editors, "Hazard Haulers", *ECON: Environmental Contractor* Jul. 1990, pp. 34–37.

Schimeck, D., "Asbestos Transportation Disposal", *Asbestos Issues* May, 1989, pp. 38–41, 43.

Gershonowitz, A., "Transporting Asbestos: Which Regulations Apply?", *Asbestos Issues* May, 1989, p. 42.

*Primary Examiner*—Romulo H. Delmendo
*Attorney, Agent, or Firm*—Woodcock Washburn Kurtz Mackiewicz & Norris

[57] ABSTRACT

A vehicle for transporting hazardous materials that may yield airborne particulate contaminants, such as asbestos, includes in the disclosed embodiment a trailer having an inner surface, an outer surface, and at least one door defined therein for providing access to an enclosed space therein. An air supply is provided for forcing outside air into the enclosed space during operation, creating at a slight overpressure in the enclosed space. An outlet opening is defined in the enclosed space for permitting air to flow out of the enclosed space as a result of the slight overpressure. The vehicle also includes a filter positioned at the outlet opening for filtering airborne particulate contaminants from the air as it flows therethrough. This continuously cleans the air of airborne particulate contaminants during operation of the vehicle. A method of operation and a filter pouch for holding the hazardous material are also disclosed.

10 Claims, 5 Drawing Sheets

METHOD FOR TRANSPORTING HAZARDOUS MATERIALS

BACKGROUND OF THE INVENTION

1. Field of the Invention

This invention relates to the serious dangers that are associated with the release of hazardous airborne contaminants into the environment. More specifically, this invention is intended to protect the environment from fugitive asbestos fibers that are released during transportation and unloading of such material, and to protect workers who must unload vehicles used to transport and dispose asbestos from EPA Demo/Remo and other source sites.

2. Description of the Prior Art

Asbestos fibers fall into the generic classification of hazardous particulates and are a well known carcinogenic hazard to humans and animals. Typical environmental standards refer to fibers that are 5 microns or greater in length with an aspect ratio of 3 to 1 or greater. The testing standards presently in use utilize a phase contrast optical microscope with about 440× magnification. These testing methods are not capable of seeing fibers below about 0.3 microns in diameter.

Actually, the average asbestos fiber is about 0.1 microns in diameter. Therefore, using the present standards and equipment, for every fiber counted there is present as many as 30 fibers uncounted. This is coupled with the standard that fibers shorter than 5 microns in length are not considered. It is now accepted that the thinner fibers are the most dangerous threat to human health. While present standards indicate "satisfactory condition" with concentrations less than 2.0 fibers per cubic centimeter, this, in reality, means that the standards allow an actual concentration of about 60 fibers per cubic centimeter, if the thinner fibers were counted. The asbestos fibers, in particular those that are thinner and shorter, remain airborne for considerable lengths of time and contaminate large volumes of air to form a substantial hazard to the environment and to the persons working or living in the area. The asbestos containing materials (ACM) are presently being handled in accordance with current EPA and DOT regulations; bagged and sometimes containerized, in theoretically "leak tight" containers. Depending upon such factors as temperature, humidity, storage, dehydration and trip duration, the ACMs, although bagged and containerized, are tossed, dropped, jostled, and punctured and the compression from the weight of the bags and containers forces asbestos fibers to escape into the trailer and into the outside air during transportation and disposal.

Many asbestos removal projects involve placing the ACMs in a six mil polyvinyl bag, then placing the bagged ACMs in another six mil polyvinyl bag. However, this arrangement is not leak tight to the smallest fibers due to conventional closure methods (twisting and taping of open ends of poly vinyl bags) and the possibility that micropores in the bag material result in the bag material not providing sufficient fiber containment during the bagging process. The bags are further jostled, punctured, and compressed during transit as the load settles and the bagged materials are compressed under their own weight. The outside environment is ultimately subjected to a substantial risk due to the high asbestos concentration buildup that occurs within the trailer. This buildup tends to be released to atmosphere when the trailer is opened at the final disposal site. Due to the lightness of the released fibers, especially the smallest fibers, asbestos may be carried far from the disposal site, where it could settle and be inhaled or ingested by humans.

U.S. Pat. No. 4,979,967 to Walker discloses one known transport system for hauling airborne contaminants such as asbestos. This system includes a fan for inducing an underpressure in a trailer, with a HEPA filter positioned between the trailer interior and the fan to filter out contaminants before they can be passed to atmosphere. This "negative pressure" system can be viewed as an adaptation of the negative pressure clean room concept that was first disclosed in U.S. Pat. No. 4,604,111 to Natale. The Walker system further includes sprayers for wetting the contaminants in order to keep dust down. Despite the wetting and filtration precautions, a significant release of fugitive fibers may be expected with this type of system at a disposal site.

It is clear there exists a long and unfilled need in the prior art for a transport system for hazardous airborne contaminants that reduces or eliminates escape of hazardous airborne contaminants to the atmosphere, both during transportation and unloading at a disposal site.

SUMMARY OF THE INVENTION

Accordingly, it is an object of the invention to provide an improved system for transporting hazardous airborne contaminants that reduces or eliminates escape of hazardous airborne particulate contaminates to the atmosphere, both during transportation and unloading.

In order to achieve the above and other objects of the invention, a vehicle for transporting hazardous materials that may yield airborne particulate contaminants, such as asbestos, includes, according to a first aspect of the invention, an enclosure for defining an enclosed space, the enclosure having an inner surface and an outer surface, the enclosure further having at least one door defined therein for providing access to the enclosed space, the door making a substantially airtight seal with the enclosure means when closed; a wheeled support for supporting the enclosure, whereby the enclosure may be moved from one location to another location; an air supply for forcing outside air into the enclosure during operation, whereby the enclosed space is maintained at a slight overpressure with respect to outside air; an outlet opening defined in the enclosure for permitting air in the enclosed space to flow out of the enclosed space as a result of the slight overpressure; and a filter positioned at the outlet opening for filtering airborne particulate contaminants from the air as it flows through the outlet opening, whereby air in the vehicle is continuously cleaned of airborne particulate contaminants during operation.

A pouch for containing hazardous airborne contaminants during transportation and disposal, includes, according to a second aspect of the invention, a bag-like body that defines an interior space, the bag-like body comprising a filter membrane material that permits air, but not airborne contaminants, to pass therethrough, the bag-like body having a front end and a back end; a first opening defined at the front end of the bag-like body, the first opening being constructed and arranged to be coupled to a source of incoming air; a second opening defined at the back end of the bag-like opening, the second opening being larger than the first opening and being sized to permit workers to conveniently load hazardous material into the bag-like opening; and a sealing structure for sealing the second opening after material has been loaded into the bag-like body, whereby, during transportation of the hazardous materials in a vehicle, air will be forced into the pouch through the first opening and subsequently filtered by the filter membrane material before being exhausted from the vehicle, and whereby the hazardous material will remain contained in the bag-like body during disposal.

A method of transporting hazardous materials, such as asbestos, that are prone to emit airborne particulates when agitated, includes, according to a third aspect of the invention, steps of (a) loading the materials into an enclosed space in a vehicle; (b) sealing the enclosed space with the material therein; (c) moving the vehicle to an intended destination at any point in time after step (b) but before step (f); (d) forcing air into the enclosed space; (e) filtering air that is displaced from the enclosed space by the air that is introduced in step (c) in order to remove airborne particulates therefrom; (f) unsealing the enclosed space; and (g) removing the material from the enclosed space, wherein steps (f) and (g) are far less likely to introduce significant contaminants into the atmosphere than would be the case if the air therein was not filtered.

According to a fourth aspect of the invention, a method of transporting hazardous materials, such as asbestos, that are prone to emit airborne particulates when agitated, includes steps of: (a) installing a filter pouch into an enclosed space in a vehicle; (b) loading material into the filter pouch; (c) sealing the filter pouch with the material therein; (d) sealing the enclosed space with the filter pouch and material therein; (e) moving the vehicle to an intended destination at any point in time after step (d) but before step (h); (f) forcing air into the enclosed space; (g) filtering air that is displaced from the enclosed space by the air that is introduced in step (c) in order to remove airborne particulates therefrom; (h) unsealing the enclosed space; and (i) removing the material together with the pouch from the enclosed space, wherein steps (e) and (f) are far less likely to introduce significant contaminants into the atmosphere than would be the case if the air therein was not filtered.

According to a fifth aspect of the invention, a method of transporting hazardous materials, such as asbestos, that are prone to emit airborne particulates when agitated, includes steps of: (a) installing a filter pouch into an enclosed space in a vehicle; (b) loading material into the filter pouch; (c) sealing the filter pouch with the material therein; (d) sealing the enclosed space with the filter pouch and material therein; (e) moving the vehicle to an intended destination; (f) unsealing the enclosed space; and (g) removing the material together with the pouch from the enclosed space, whereby the transportation process is far less likely to introduce significant contaminants into the atmosphere than would be the case if the filter pouch was not used.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
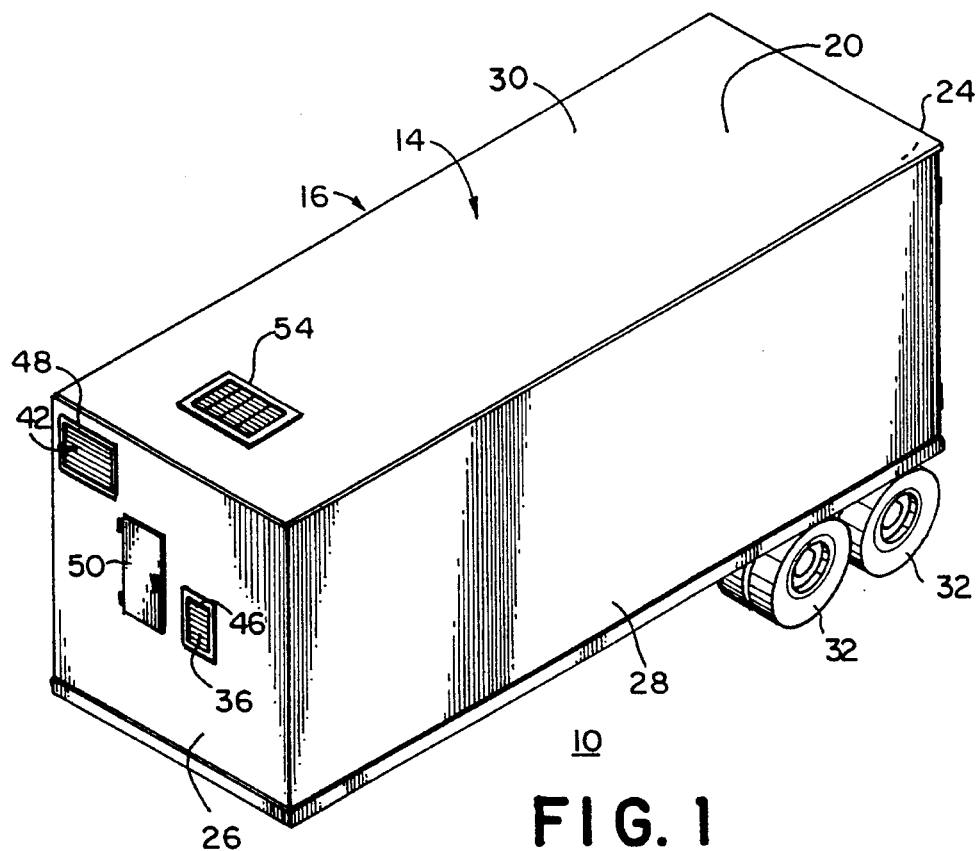
FIG. 1 is a perspective view of improved system of transporting hazardous material that is constructed according to a preferred embodiment of the invention.
Figure 2:
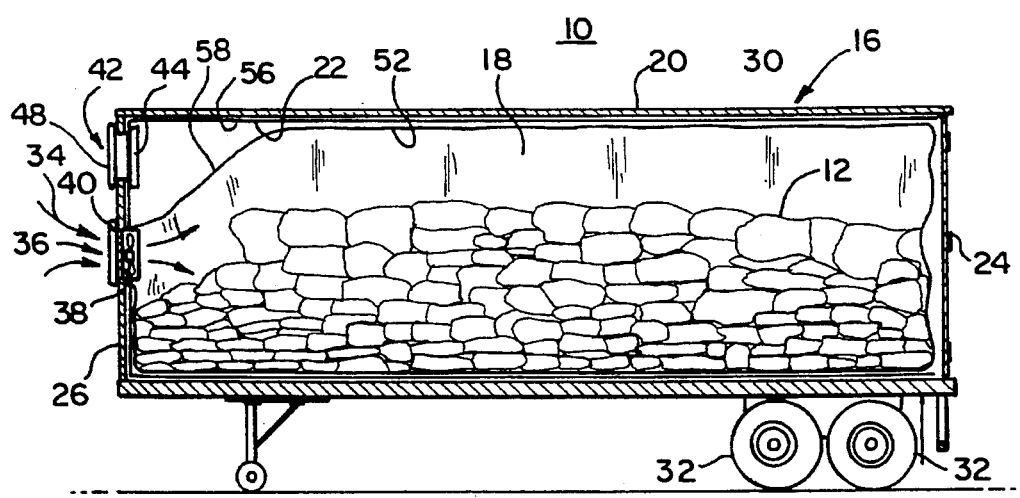
FIG. 2 is a longitudinal cross-sectional view through the system that is depicted in FIG. 1.

Referring now to the drawings, wherein like reference numerals designate corresponding structure throughout the views, and referring in particular to FIGS. 1 and 2, an improved transport system for hazardous materials that is constructed according to a preferred embodiment of the invention includes a vehicle 10, which is shown in FIG. 2 to have hazardous materials 12, such as asbestos, contained therein.

As may be seen in FIGS. 1 and 2, vehicle 10 includes an enclosure 14, which in the preferred embodiment is a trailer 16 having an enclosed space 18 defined therein by an inner surface 22. Trailer 16 further has an outer surface 20 that is defined by a pair of sealable doors 24, a forward wall 26, a pair of side walls 28 and a top wall 30. Trailer 16 further includes a number of wheels 32 on which the trailer 16 is supported for movement during transport.

As may best be seen in FIG. 2, vehicle 10 further includes a supply 34 of pressurized outside air, which in the preferred embodiment is a fan unit 38 that is positioned at an inlet 36 that is defined in the forward wall 26 of the trailer 16. A removable HEPA filter 40 is preferably mounted over the inlet 36. Removable filter 40 may be mounted on hinges, so it can be moved back and forth from an operative to a non-operative position, for purposes that will be discussed in greater detail below.

Vehicle 10 further has an outlet opening 42 defined in forward wall 26, as may be seen in FIGS. 1 and 2. A HEPA filter 44 is positioned over the outlet 42, as may best be seen in FIG. 2. Standard grilles 46, 48 are provided on the exterior of trailer 16 for covering the inlet and outlet openings 36, 42, respectively, as may be seen in FIG. 1. An access door 50 is preferably provided in the forward wall 26 of trailer 16 to allow an operator to gain access to the forward portion of the enclosed space 18, including the fan unit 38 and the HEPA filter 44.

One particularly advantageous feature of the invention involves the provision of a filter pouch 52 within the enclosed space 18 of trailer 16 for containing the hazardous air borne contaminants 12. As is typical, the inner surface 22 of trailer 16 is lined with a liner 56, which, according to the invention, is formed of a low friction material, such as polyethylene or polypropylene. Filter pouch 52 is, in the preferred embodiment, a fabric pouch unit 58 that is fabricated from a filter membrane material that is tear resistant and permits air, but not airborne contaminates, to pass therethrough. Preferably, the filter membrane material comprises a non-woven fabric material, such as spunbond polyethylene, spunbond polypropylene or the three-layer SMS polypropylene laminate that is commercially available from Kimberly-Clark corporation. Multiple layers of such materials could be provided, which would increase the fitting efficiency of filter pouch 52.

Figure 3D:
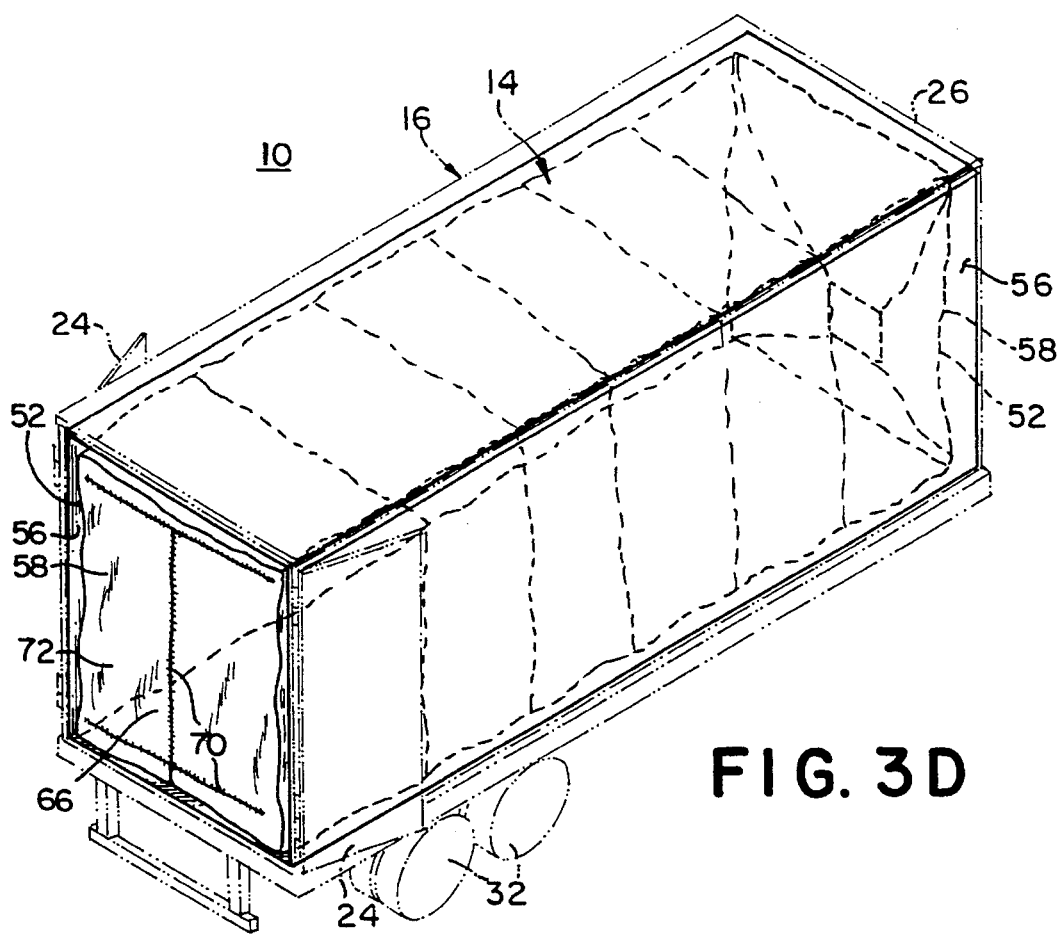
FIG. 3D is a diagrammatical depiction of a fourth step in the process that is shown in FIGS. 3A, 3B and 3C.
Figure 4:
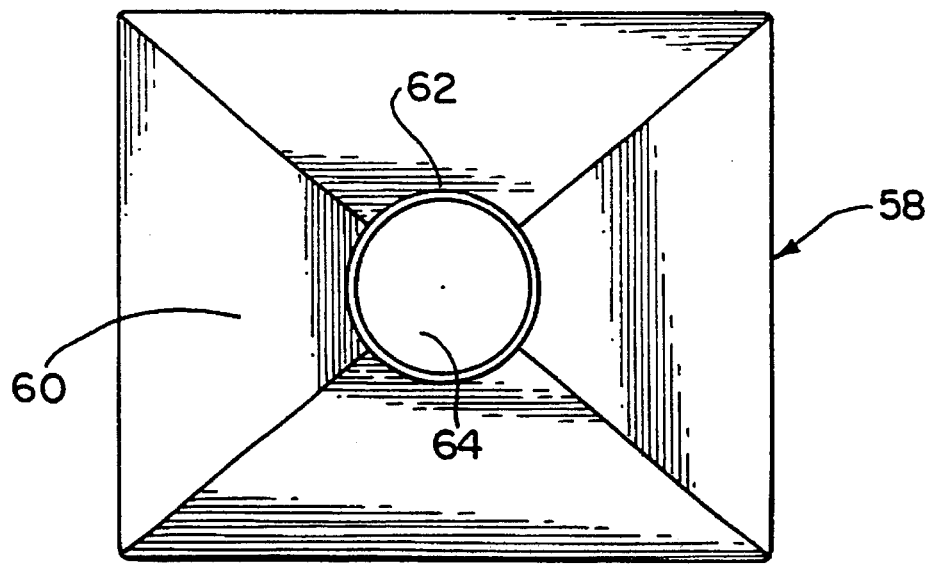
FIG. 4 is a front-end elevational view of a fabric pouch unit that is constructed according to one aspect of the invention.
Figure 5:
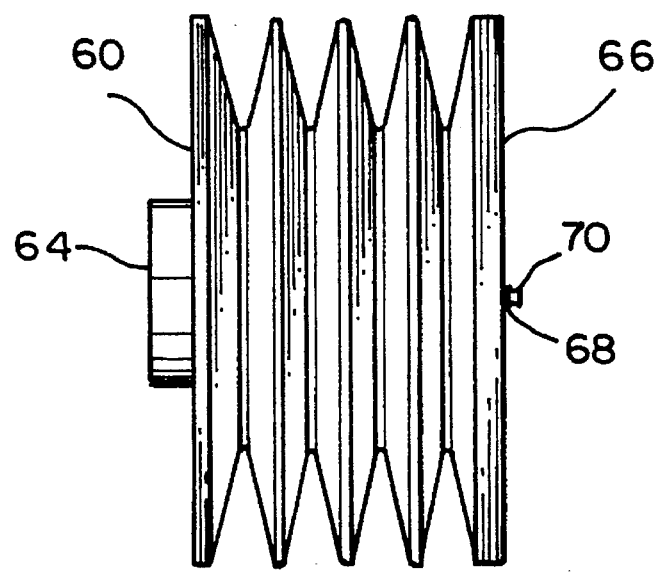
FIG. 5 is a side elevational view of the fabric pouch unit that is shown in FIG. 4.

Referring briefly to FIGS. 4 and 5, fabric pouch unit 58 is preferably constructed as a bag-like body that defines an interior space. A nipple 62 is preferably provided at a front end of the pouch unit 58 to define a first opening 64, for purposes that will be discussed in greater detail below. A second, larger opening 72, visible in FIG. 3D, is provided at a back end 66 of the pouch unit 58 for providing access during loading of the hazardous material 12 into the pouch unit 58. Second opening 72 is preferably sealable by a sealing structure 68, which in the illustrated embodiment may be a zipper 70, or an equivalent structure, such as velcro, hooks or clamps.

Figure 6:
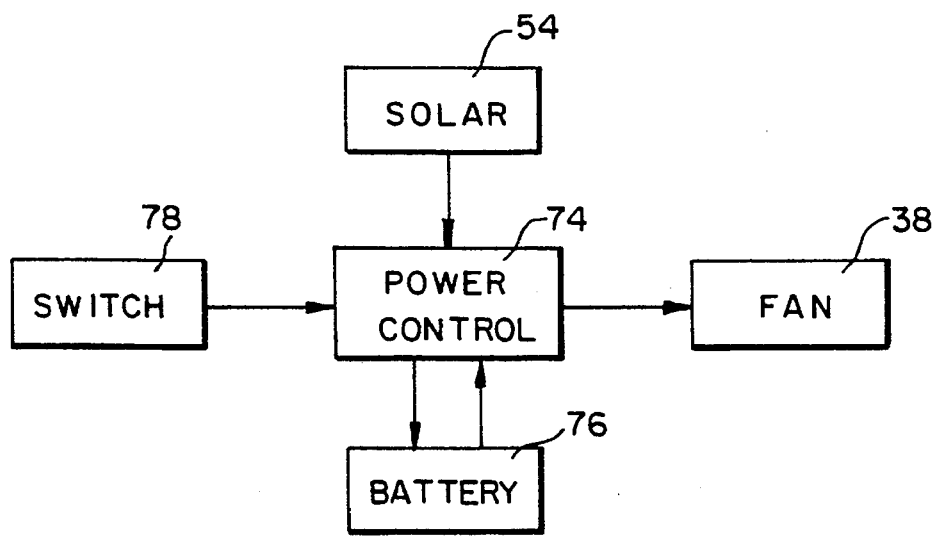
FIG. 6 is a schematic depiction of a power control system for the system that is shown in FIGS. 1 and 2.

Looking briefly to FIG. 6, it will be seen that the operation of fan 38 is ordinarily powered by a battery 76, or a photovoltaic cell array 54. A power control 74 coordinates the supply of power to the fan 34 from the cell array 54 or the battery 76, depending upon the power that is available from the cell array 54. A switch 78 that is actuatable by an operator determines whether the power control 74 will instruct the fan 38 to be operated in a first direction, a second direction, or not at all.

Referring now to FIGS. 3A–3D, a method of transporting hazardous material according to a preferred embodiment of the invention will now be discussed.

Figure 3A:
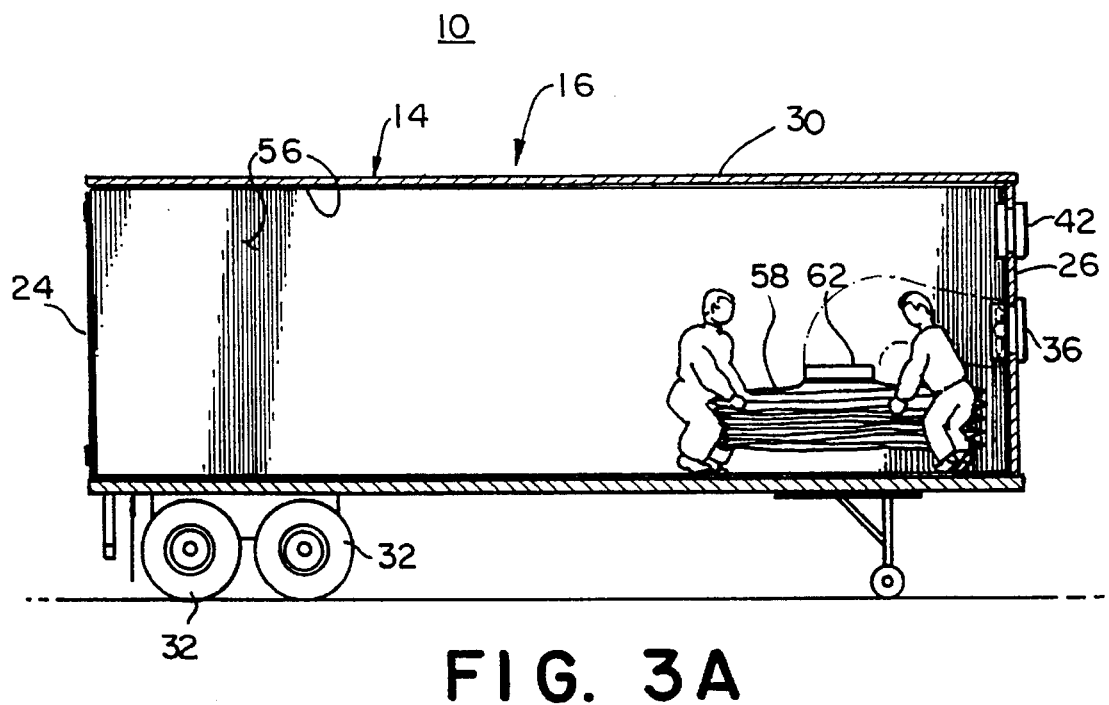
FIG. 3A is a diagrammatical depiction of a first step in the preparation of a system as depicted in FIGS. 1 and 2 to haul hazardous materials.
Figure 3B:
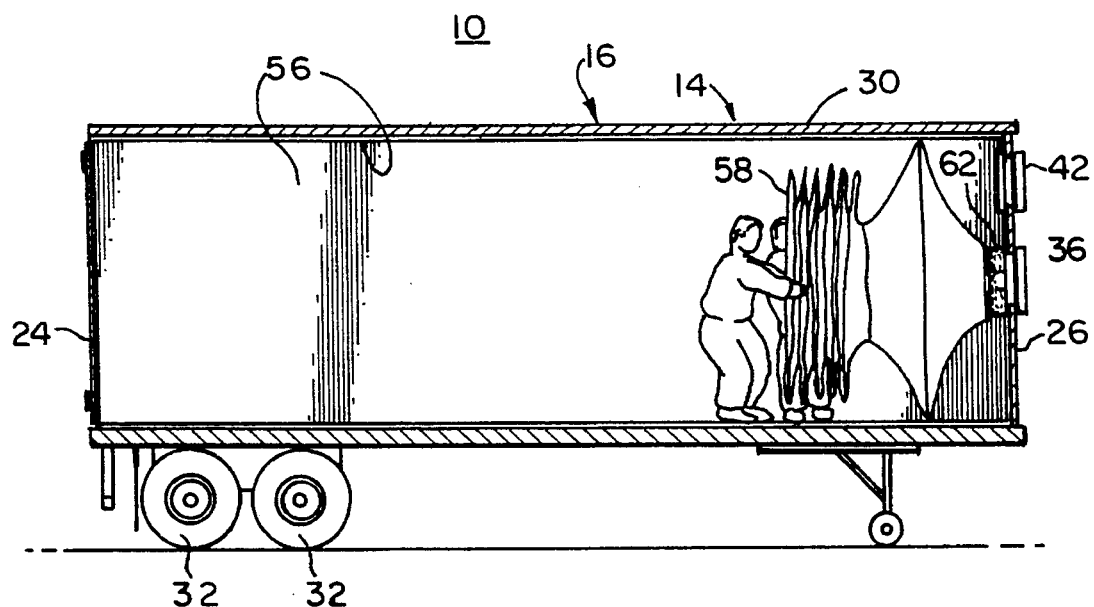
FIG. 3B is a diagrammatical depiction of a second step in the process that is depicted in FIG. 3A.

As may be seen in FIG. 3A, the trailer 16 is first lined with the low friction liner 56, and the HEPA filter 44 is inspected to make sure that it is clean. A fabric pouch unit 58 is then brought into the trailer 16, as shown in FIG. 3A, is removed from its packaging, and is mounted so that its nipple 62 is in communication with the inlet 36 and air supply 34. The zipper 70 at the back end 66 of the pouch unit 58 is, at this point, closed. The fan unit 38 is then turned on, inflating the fabric pouch unit 58, as shown in FIG. 3B. The fabric pouch unit 58 may be taped at selected points to the liner 56 at this point in time.

Figure 3C:
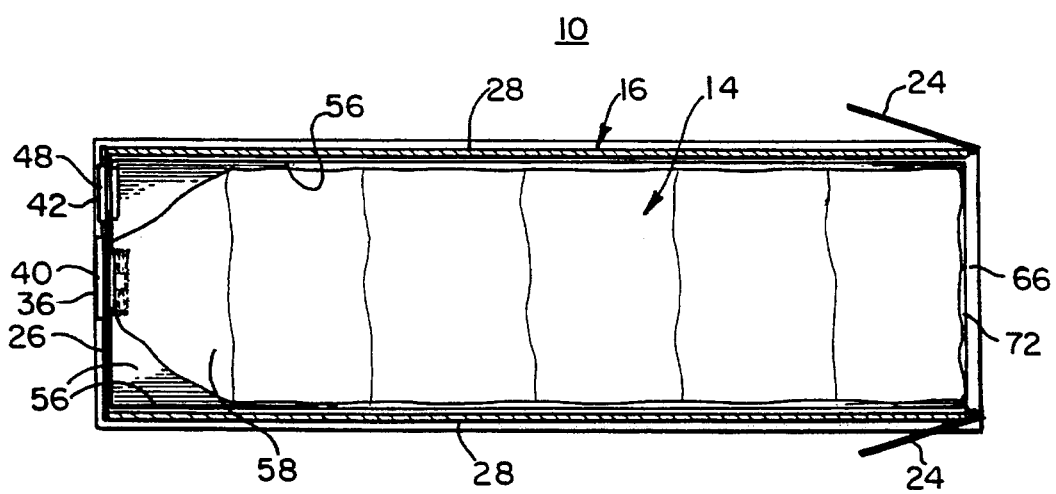
FIG. 3C is a diagrammatical depiction of a third step in the process that is depicted in FIGS. 3A and 3B.

Once the fabric pouch unit 58 has been installed, the zipper 70 at the back end 66 is opened, thus opening the second opening 72 of the pouch unit 58. At this point, the fan unit 38 is reversed and filter 40 is positioned over the inlet 36, causing air to flow from the rear of the trailer and the fabric pouch unit to the front of the trailer, as is shown in FIG. 3C. Hazardous material such as asbestos may be loaded into the filter pouch at this point. When loading is completed, the zipper 70 is closed, thus sealing the contaminants within the fabric pouch unit 58. The doors 24 of the trailer are than closed and sealed.

During transport, filter 40 is removed from the inlet 36, and the fan unit 38 is actuated so as to force air through the inlet 36 into the fabric pouch unit 58, as shown in FIG. 2. As the hazardous material 12 is agitated during transportation, most of the fugitive fibers so created will be trapped within the filter membrane of the filter pouch 52. Those that are not so trapped will be trapped by the HEPA filter 44 at the outlet 42 of the trailer 16. When the trailer 16 reaches the intended disposal site, the filter pouch 52 makes it easy to remove the hazardous materials 12 from the trailer 16 with out resulting in an escape of fugitive fibers to the atmosphere. The filter pouch 52 is first disconnected from the inlet 36 and the fan unit 38 by an operator who accesses this area through the access door 50 and the nipple 62 is then tied off by the operator. The doors 24 of the trailer are then open, and, by tilting the trailer rearwardly, the entire filter pouch 52 along with the hazardous material 12 inside will slide out as a unit onto the disposal site, due to the low friction that is present between the low friction liner 56 and the filter pouch 52. Since the filter pouch 52 surrounds the hazardous materials during the entire disposal process, little or no fugitive fibers will be released to atmosphere at the disposal site.

Figure 7:
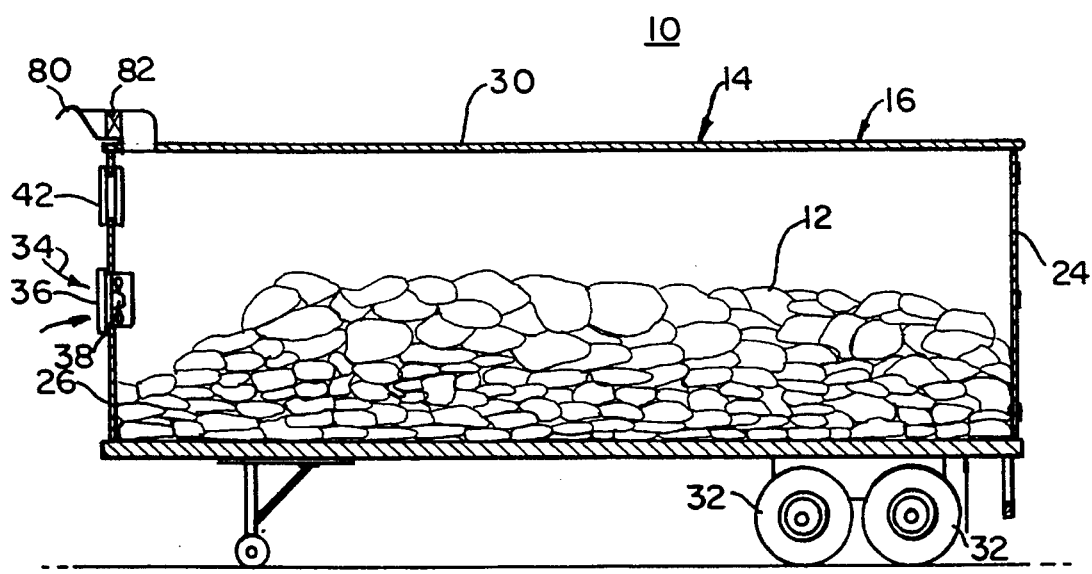
FIG. 7 is a longitudinal cross-sectional view through a system that is constructed according to a second embodiment of the invention.

FIG. 7 depicts an alternative embodiment of the invention, wherein an air scoop 80 having a one-way valve 82 associate therewith is provided at the top of the trailer 16 to provide a source of pressurized air into the trailer during transportation. Air scoop 80 may be used in tandem with fan 36, or in lieu of the fan 36 when the vehicle 10 is traveling at appropriate speeds.

Alternatively, the invention could be practiced by transporting the contaminant material in smaller fabric bags or pouches that are sized so that they could be removed at a disposal site by hand or mechanically. Such bags or pouches might be sized similarly to the bags of hazardous material 12 that are shown in FIG. 2. Fabric bags would allow air to be displaced, such as during stacking or transportation, without fugitive fiber emission of the scale that would occur with with a poly bag that might have tears or micropores therein.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of transporting hazardous materials that are prone to emit airborne particulate when agitated, comprising: (a) installing a filter pouch into an enclosed space in a vehicle; (b) loading material into the filter pouch; (c) sealing the filter pouch with the material therein; (d) sealing the enclosed space with the filter pouch and material therein; (e) moving the vehicle to an intended destination at any point in time after step (d) but before step (h); (f) forcing air into the enclosed space; (g) filtering air that is displaced from the enclosed space by the air that is introduced in step (f) in order to remove airborne particulate therefrom; (h) unsealing the enclosed space; and (i) removing the material together with the pouch from the enclosed space, wherein steps (e) and (f) are far less likely to introduce significant contaminants into the atmosphere than would be the case if the air therein was not filtered.

2. A method according to claim 1, wherein step (a) comprises communicating said filter pouch with a source of pressurized air to inflate said filter pouch.

3. A method according to claim 1, wherein step (c) comprises zippering an open in said pouch shut.

4. A method according to claim 1, further comprising a step of installing a protective liner within the enclosed space prior to step (a), said protective liner having a surface that has lower friction than the floor of the enclosed space upon which said filter pouch will easily slide in step (i).

5. A method according to claim 1, wherein step (f) comprises forcing air directly into said filter pouch, whereby said air will be filtered by the pouch before being displaced from the enclosed space.

6. A method of transporting hazardous material that are prone to emit airborne particulate when agitated, comprising: (a) installing a filter pouch into an enclosed space in a vehicle; (b) loading material into the filter pouch; (c) sealing the filter pouch with the material therein; (d) sealing the enclosed space with filter pouch and material therein; (e) moving the vehicle to an intended destination; (f) unsealing the enclosed space; and (g) removing the material together with the pouch from the enclosed space, whereby the transportation process is far less likely to introduce significant contaminants into the atmosphere than would be the case if the filter pouch was not used.

7. A method according to claim 6, wherein step (a) comprises communicating said filter pouch with a source of pressurized air to inflate said filter pouch.

8. A method according to claim 6, wherein step (c) comprises zippering an opening in said pouch shut.

9. A method according to claim 6, further comprising a step of installing a protective liner within the enclosed space prior to step (a), said protective liner having a surface that has lower friction than the floor of the enclosed space upon which said filter pouch will easily slide in step (g).

10. A method of transporting hazardous materials that are prone to emit airborne particulates when agitated, comprising: (a) loading the materials into an enclosed space in a vehicle; (b) sealing the enclosed space with the material therein; (c) moving the vehicle to an intended destination at any point in time after step (b) but before step (f); (d) forcing air into the enclosed space with an air scoop that is mounted on the exterior of the vehicle to create an over pressure in the enclosed space; (e) filtering air that is displaced from the enclosed space by the air that is introduced in step (d) in order to remove airborne particulates therefrom; (f) unsealing the enclosed space; and (g) removing the material from the enclosed space, wherein steps (f) and (g) are far less likely to introduce significant contaminants into the atmosphere than would be the case of the air therein was not filtered.

\* \* \* \* \*

UNITED STATES PATENT AND TRADEMARK OFFICE
CERTIFICATE OF CORRECTION

PATENT NO. : 5,522,919
DATED      : June 4, 1996
INVENTOR(S) : SARGENT AND DISMUKES It is certified that error appears in the above-indentified patent and that said Letters Patent is hereby corrected as shown below:

Column 8, Line 17, delete "of the air" and insert therefor
--if the air--

Column 7, Line 1, delete "material" and insert therefor
--materials--

Signed and Sealed this

Tenth Day of September, 1996

Attest:

BRUCE LEHMAN

Attesting Officer

Commissioner of Patents and Trademarks